Patented May 22, 1945

2,376,702

UNITED STATES PATENT OFFICE 2,376,702

PROCESS FOR INCREASING THE EFFI-CIENCY OF INSECT DESTROYING DRUG EXTRACTS

Jean Komeda, Schaerbeek-Brussels, Belgium; vested in the Alien Property Custodian No Drawing. Application December 26, 1940, Serial No. 371,834. In Belgium June 21, 1939

5 Claims. (Cl. 167—24)

The various drugs, such as pyrethrum or insect flowers, those known in French terminology as derris or deguelie, cubée or tachigalie, etc., have acquired an increasing importance for the destruction of insects. In using them, the plants are ground, after having been previously dried, and the powder obtained in this manner is applied by pulverization. By acting in this manner a small portion only of the useful principles contained in the powder is used, or, alternatively, the effect of the latter is so slow, that great quantities of such powders must be used in obtaining satisfactory results. Therefore this manner of proceeding was soon improved by isolating the active principles of the plants by extraction, so as to obtain them in a pure and concentrated form. The extracts so obtained were used by vaporizing more or less concentrated solutions. For extracting these active principles organic solvents, such as benzene, acetone, carbonic acid, carbon tetrachloride, and the like are used almost exclusively.

It has been found according to the present invention, that the insect destroying properties of these products, obtained by extraction, can be increased in very great proportions, if extraction is performed in presence of organic or inorganic acids. For instance, it has been possible to increase by 50% the insect destroying effect of an extract from pyrethrum flowers or insect flowers, if the latter is prepared by means of carbon tetrachloride in the presence of phosphoric acid and of formic acid. With the extract obtained in this manner, used in solution a more complete and quicker mortality of the insects was attained.

Moreover, it has been proved to be a further advantage of this process, that, by an acid extraction there is quantitatively obtained a greater quantity of extract, this being an important economy of starting materials used.

Example 1

400 gr. of finely ground pyrethrum flowers, are treated with a mixture of 3.5 kg. of carbon tetrachloride and 0.5 kg. of formic acid. The extract so obtained, as compared with an extract obtained normally, in which the same quantity of pyrethrum flowers would have been treated with 4 kg. of carbon tetrachloride has shown an increase of 20% of insect destroying effect, under identical experimental conditions.

Example 2

400 gr. of finely ground pyrethrum flowers, were treated with 3.4 kg. of carbon tetrachloride, 0.5 kg. of formic acid and 0.1 kg. of phosphoric acid. The extract obtained in this manner has shown, as compared with the extract obtained by a normal extraction merely with carbon tetrachloride, an increase of the insect destroying effect of 50%, under identical experimental conditions.

Having now described the object of my invention and the manner in which it is to be performed, I declare that what I claim is:

1. The process of making an insecticide which comprises extracting finely ground vegetable material selected from the class consisting of pyrethrum, derris and cube in the presence of formic acid with an organic solvent nonreactive to said acid, of the group consisting of benzene, acetone and carbon tetrachloride, the acid being present in minor proportion than that of the solvent.

2. The process of making an insecticide which comprises extracting finely ground vegetable material selected from the class consisting of pyrethrum, derris and cube with a mixture of carbon tetrachloride and formic acid, said acid constituting the minor part of the mixture.

3. The process of making an insecticide which comprises extracting four parts by weight of finely ground pyrethrum flowers with a mixture of thirty-five parts of carbon tetrachloride and five parts of formic acid.

4. An insecticidal solution consisting of the extract of pyrethrum flowers in carbon tetrachloride acidulated with formic acid.

5. An insecticidal solution consisting of the extract of approximately four parts by weight of pyrethrum flowers in thirty-five parts of carbon tetrachloride acidulated with formic acid.

JEAN KOMEDA.